(12) United States Patent
Williams

(10) Patent No.: US 6,312,161 B1
(45) Date of Patent: Nov. 6, 2001

(54) END CAP FOR BEARING ASSEMBLY

(75) Inventor: Samuel R. Williams, Franklin County, OH (US)

(73) Assignee: The Timken Company, Canton, OH (US)

( * ) Notice: Subject to any disclaimer, the term of this patent is extended or adjusted under 35 U.S.C. 154(b) by 0 days.

(21) Appl. No.: 09/540,147

(22) Filed: Mar. 31, 2000

(51) Int. Cl.$^7$ ................................................ F16C 33/36
(52) U.S. Cl. ................................. 384/459; 384/585
(58) Field of Search ................................ 384/489, 459, 384/540, 542, 559, 562, 571, 584, 585, 589

(56) References Cited

U.S. PATENT DOCUMENTS

| | | | |
|---|---|---|---|
| 2,901,299 | * 8/1959 | Cramer et al. | 384/459 |
| 3,603,655 | * 9/1971 | Keller et al. | 384/459 |
| 3,790,238 | * 2/1974 | Otto | 384/486 |
| 3,833,277 | * 9/1974 | Jones | 384/459 |
| 4,819,949 | 4/1989 | Otto | 277/351 |
| 5,462,367 | 10/1995 | Davidson et al. | 384/459 |

FOREIGN PATENT DOCUMENTS

54135948-A  * 10/1979 (JP) ........................................ 384/584

* cited by examiner

*Primary Examiner*—Thomas R. Hannon
(74) *Attorney, Agent, or Firm*—Polster, Lieder, Woodruff & Lucchesi, L.C.

(57) ABSTRACT

An end cap holds an antifriction bearing on a journal at the end of an axle, clamping the inner race of the bearing tightly against a backing ring that is located around the journal. The end cap has an cross wall which extends across the end of the journal and an axial wall formed integral with the cross wall and extended over the journal to provide an abutment surface which is presented toward the inner race of the bearing. The cross wall contains bolt holes through which cap screws pass to thread into the journal and secure the end cap on the journal. The end wall possesses its thickest cross section in regions between the bolt holes and its thinnest cross section in regions generally surrounding the bolt holes. This distributes the clamping force exerted by the cap screws more uniformly over the abutment surface at the end of the axial wall.

19 Claims, 3 Drawing Sheets

END CAP FOR BEARING ASSEMBLY

CROSS REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

This invention relates in general to a bearing assembly for axle journals and, more particularly, to a bearing assembly having an improved end cap and to the end cap itself.

One type of bearing (FIG. 1) which finds widespread use on the journals of rail car axles, has an outer race known as a double cup, an inner race composed of two cones arranged end to end, and tapered rollers arranged in two rows between the cup and cones, there being a separate row around each cone. The bearing actually forms part of a package or assembly which further includes a backing ring that seats against a fillet or shoulder at one end of a journal and an end cap that fits over the opposite end of the journal where it is secured with three cap screws that thread into the journal. The two cones fit around the journal between the backing ring and the end cap, and the cap screws clamp the cones firmly in place, with the clamping force being transferred through the end cap. Seals fit into the ends of the cup and establish fluid barriers along the cones in some assemblies and along seal wear rings in others, with those wear rings likewise being clamped up by the cap screws—there being one wear ring between the backing ring and inboard cone and the other between the end cap and the outboard cone. The two cones should be fitted to the journal with an interference fit and relatively heavy torque should be applied to the cap screws, all to minimize fretting along the journal.

More particularly, loose cones will themselves rotate around the journal, that is to say, the cylindrical surface of the journal will roll along the surfaces of the cone bores. This in itself produces fretting and hence, the need for the interference fit between the cones and the journal. But additional flexure develops as a consequence of the journal supporting the rail car and its load in the manner of a cantilever. This flexure produces minute movement axially between the journal and the cone bores, primarily at the bore of the inboard cone. A large clamping force exerted by the cap screws and transferred through the end cap minimizes this type of fretting, but does not eliminate it.

Indeed, the flexure produces wear along the faces where the end cap abuts a mating surface, whether that face be on the outboard cone or on a wear ring, and that wear leads to greater movement and more fretting. Cap screws can tolerate only a limited amount of torque, and furthermore, when turned down with excessive torque can distort the end cap. This may produce gaps which allow water to seep onto the surface of the journal and exacerbate the fretting that occurs. In this regard, this typical end cap has an axial wall which extends along the journal and a cross wall which is formed integral with the axial wall and extends over the end face of the journal. The cap screws pass through the cross wall, and when turned down urge that wall toward the end of the journal and the surrounding axial wall toward the cones of the bearing. The cross wall generally has uniform thickness (FIG. 1) and tends to deflect more in the region of the cap screws than elsewhere. This distortion transfers to the axial wall.

SUMMARY OF THE INVENTION

An end cap for retaining an antifriction bearing on the journal of an axle has an abutment face and a cross wall around which the abutment faces extends. The end cap is secured to the journal with cap screws which pass through bolt holes in its cross wall and thread into the journal. The cross wall of the end cap is thicker between the bolt holes than it is in the regions of the bolt holes. This produces a more uniform force along the abutment face when the cap screws are tightened. The invention also resides in a bearing assembly including the end cap.

DETAILED DESCRIPTION OF THE DRAWINGS

Figure 1:
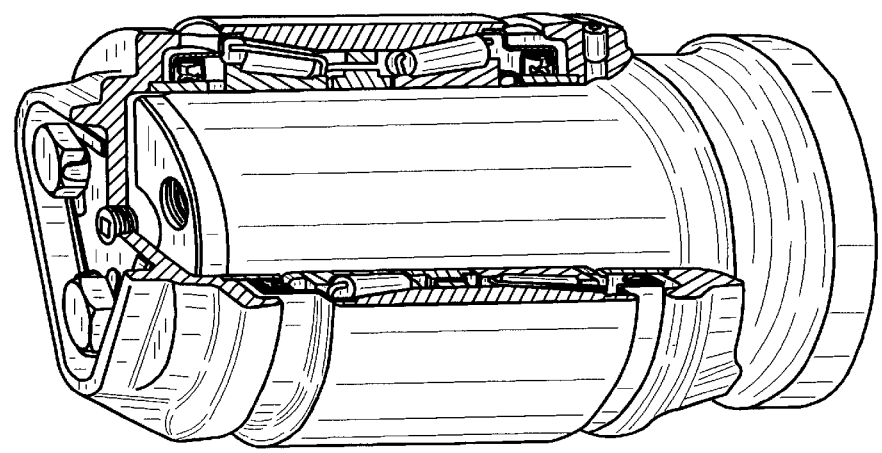
FIG. 1 is a perspective view, partially broken away and in section, of a bearing assembly having an end cap formed in accordance with the prior art.
Figure 2:
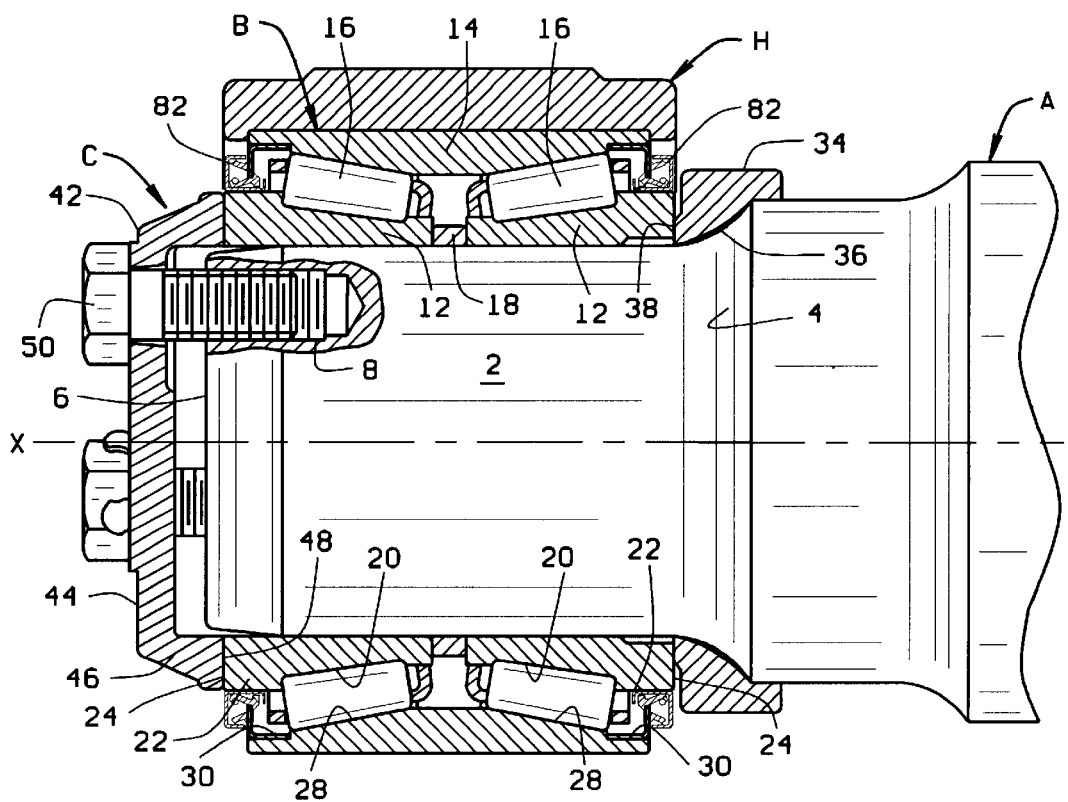
FIG. 2 is a sectional view of a bearing assembly having an end cap constructed in accordance with and embodying the present invention.

Referring now to the drawings (FIG. 2), a bearing B fits between a housing H and the end of an axle A and enables the axle A to rotate under the housing H, thus supporting the housing H which it carries. The bearing B, which establishes an axis X of rotation for the axle A, forms part of a bearing assembly C that is usually furnished as a package. Typically, the axle A will have flanged rail car wheels on it, and the housing H will fit into the side frame of a rail car truck. But the bearing assembly C has other applications as well, such as for the wheels of cranes, for table rolls at rolling mills and even the work rolls, and for supporting large sheaves.

The axle A at its end undergoes a reduction in diameter, thus forming a journal 2 (FIG. 2) having a cylindrical exterior surface. The journal 2 merges into the main body of the axle A at a curved shoulder or fillet 4. At its opposite end it has an end face 6 which is squared off with respect to the axis X. The journal 2 contains three threaded holes 8 which open out of the end face 6. They are located equidistantly from the axis X and at 120° intervals.

The bearing B fits around the journal 2 of the axle A and within the housing H which is located generally over the journal 2. It includes (FIG. 2) an inner race in the form of inboard and outboard cones 12, an outer race in the form of a double cup 14, rolling elements in the form of tapered rollers 16 arranged in two rows between the cones 12 and the cup 14, there being a separate row around each cone 12, and a spacer ring 18 located between the two cones 12. Each cone 12 has a tapered raceway 20 and a thrust rib 22 at the large end of the raceway 20. The thrust rib 22 extends out to a back face 24 which is squared off with respect to the axis X. The two cones 12 fit over the journal 2 with their back faces 24 being presented away from each other, An interference fit on the order of 0.0025 to 0.0045 inches exists between the cones 12 and the journal 2. The cup 14 fits within housing H which is configured to confine it—and the bearing B—axially, but nevertheless allows it to rotate in minute increments, that is to say, creep in the circumferential direction. The cup 14 has two raceways 28 which surround the raceways 20 of the two cones 12 and taper downwardly toward an intervening surface. At their opposite or large ends the raceways 28 open into end bores 30 within which the thrust ribs 22 of the cones 20 are located. The tapered rollers 16 are arranged in two rows between the opposed raceways 20 and 28 of the cones 12 and cup 14, respectively. Generally speaking, line contact exists between the raceways 20 and 28 and the tapered side faces of the rollers 16. Moreover, the large ends of the rollers 16 bear against the thrust ribs 22 of the cones 12 which prevent the rollers 16 from moving up the raceways 20 and 28 and out of the ends of the bearing B. The rollers 16 are on apex, meaning that within each row, the conical envelopes formed by the rollers 16 of that row have their apices at a common point along the axis X. The spacer 18 establishes the distance between the raceways 20 of the two cones 12 and thus determines the setting for the bearing B. That setting is one of slight end play, and thus slight radial and axial free motion exists between the two cones 12 and the cup 14. Since the rollers 16 of the two rows taper downwardly toward each other, thus giving the bearing B the indirect configuration, the bearing B will carry radial load as well as thrust loading in either axial direction.

In addition to the bearing B, the bearing assembly A includes (FIG. 2) a backing ring 34 which has a contoured surface 36 that conforms to and fits against the fillet 4 at the inboard end of the journal 2. The backing ring 34 also has an abutment surface 38 which is squared off with respect to the axis X and is presented toward the bearing B. Indeed, the abutment surface 38 abuts the back face 24 on the inboard cone 12 of the bearing B.

The bearing assembly A also includes an end cap 42 (FIG. 2) which fits over the end face 6 of the journal 2 and bears against the back face 24 of the outboard cone 12. It may be cast from ductile iron or from steel or it may be a steel forging, but in any event, it is an integral unit that includes a cross wall 44 and an axial wall 46 which is directed away from the cross wall 44, terminating at an abutment face 48 that is squared off with respect to the axis X. The axial wall 46 fits around the outboard end of the journal 2—indeed, far enough to enable the abutment face 48 to bear against the back face 24 on the outboard cone 12. When the end cap 42 is so disposed, its cross wall 44 lies slightly beyond the end face 6 on the journal 2.

The end cap 42 is secured to the journal 2 with cap screws 50 which pass through the cross wall 44 and engage the threaded holes 8 in the journal 2. When tightened, the cap screws 50 urge the end cap 42 toward the backing ring 34 to clamp the two cones 12 and the spacer ring 18 of the bearing B tightly between the backing ring 34 and end cap 42.

Figure 3:
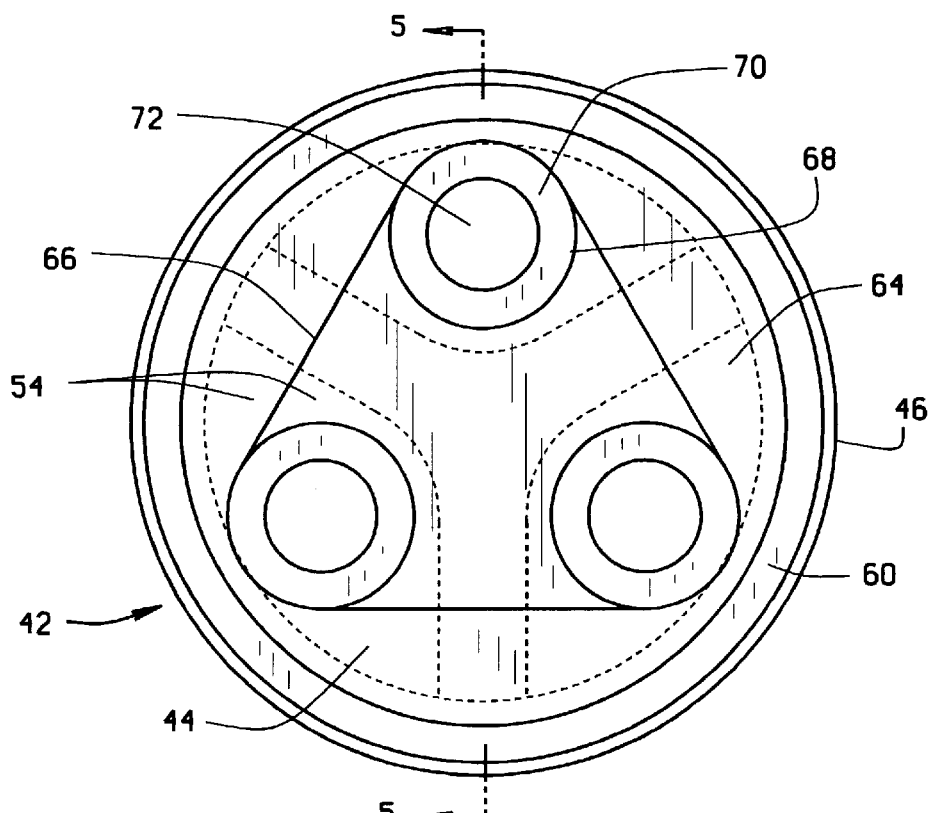
FIG. 3 is a front view of the end cap.
Figure 4:
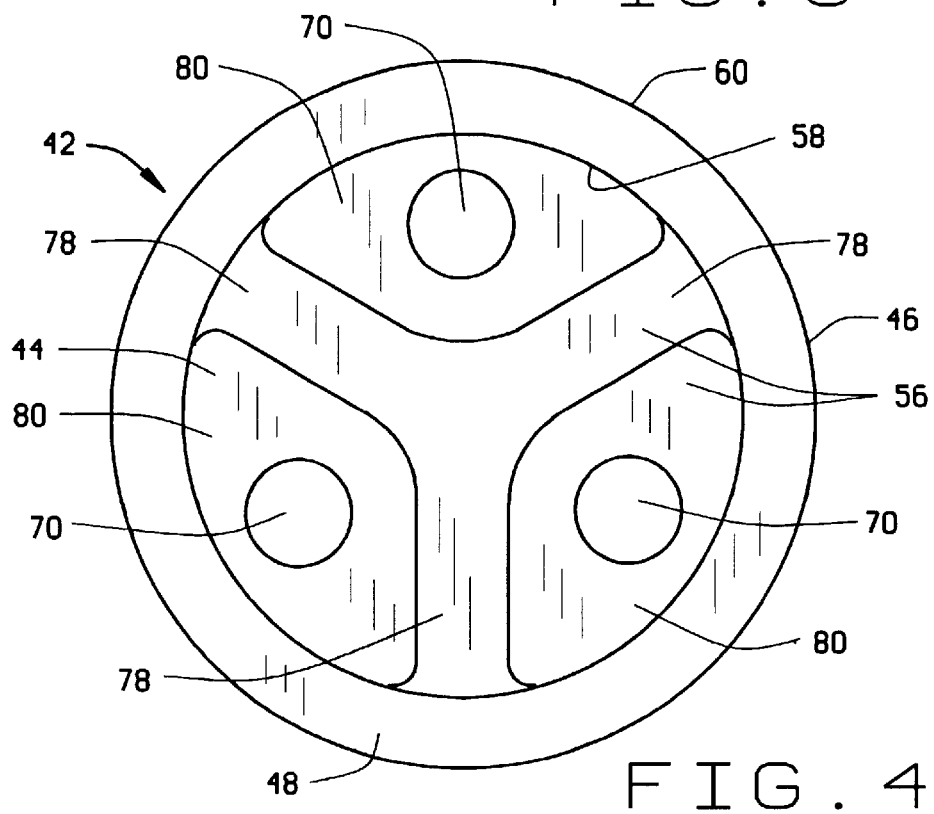
FIG. 4 is a rear view of the end cap.

The cross wall 44 of the end cap 42 has a front face 54 (FIG. 3) that is presented away from end face 6 of the journal 2 and a rear face 56 (FIG. 4) which is present toward the end face 6. The axial wall 46, on the other hand, has an inside face 58 (FIG. 5) which is cylindrical, thus creating within the end cap 42, a bore that leads from the rear face 56 of the cross wall 44 out to the abutment face 48. The axial wall 46 also has an outside face 60 which extends from the abutment face 48 to the front face 54 of the cross wall 44. It has a taper, with its greatest diameter being toward the abutment face 48. Thus, the axial wall 46 has its greatest thickness at the abutment face 48.

Figure 5:
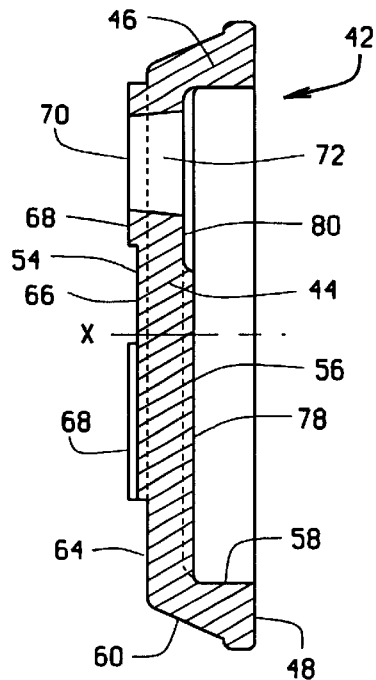
FIG. 5 is a sectional view of the end cap taken along line 5—5 of FIG. 3.

The front face 54 (FIGS. 3 & 5) includes a peripheral surface 64 and a triangular land 66 that lies within the peripheral surface 64, but is raised from it. The peripheral surface 64 merges into the outside face 60 of the axial wall 46. The triangular land 66 at each of its corners has a circular boss 68 that projects slightly beyond the land 66 and terminates at a raised surface 70. Indeed, the peripheral edge of the land 66 merges into and coincides with the corner edges of the bosses 68, so that the bosses 68 form rounded corners on the land 66. The three bosses 68 are arranged at 120° intervals and each contains a bolt hole 72 that is large enough to loosely receive one of the cap screws 50. The holes 72 lie equidistantly from the axis X and are arranged in a pattern that corresponds with that of the threaded holes 8 in the journal 2. Thus, the end cap 42 may be rotated to a position in which its holes 72 align with the threaded holes 8 in the journal 2. While the peripheral surface 64 and the land 66 lie in parallel planes that are perpendicular to the axis X, the raised surfaces 70 of the bolt bosses 68 lie in planes that are slightly inclined with respect to the peripheral surface 64 and land 66, each having its greatest elevation where it is closest to the axis X and its least along the rounded corner of the land 66. (FIG. 5—inclination exaggerated). Thus, the raised surfaces 70 of the bolt bosses 68 slope downwardly toward the axial wall 46. For a bolt boss 68 having a one inch radius, the difference in elevation between the regions closes and farthest from the axis X should range between 0.008 in. and 0.023 in.

On its rear face 56 face the cross wall 44 has (FIGS. 4 & 5) three ribs 78 which radiate from the axis X, where they merge, and extend out to the inside face 58 of the axial wall 46. The bolt holes 72 lie between the ribs 78. In addition the rear face 56 has recessed surfaces 80 which lie between the ribs 78 where they also extend out to the cylindrical inside face 58 of axial wall 46. The bolt holes 72 open out of the rear face 56 through the recessed surfaces 80 and are centered between the ribs 78. The recessed surfaces 80 lie in a common plane that is perpendicular to the axis X. The cross wall 44 has its greatest thickness at the ribs 78 and its least thickness at the recessed surfaces 74, particularly the regions of the surfaces 76 that underlie the peripheral surface 64 on the front face 54.

Finally, the bearing assembly C includes seals 82 (FIG. 2) which fit into the end bores 30 of the double cup 14 and around the thrust ribs 22 on the two cones 12. The seals 82 establish live fluid barriers that close the annular ends of the bearing B, keeping grease within the interior of the bearing B and excluding contaminants from it. U.S. Pat. No. 4,819, 949 entitled Shielded Seal Assembly discloses a seal which, with minor alterations, is suitable for use as each seal 82.

To install the bearing assembly C on the journal 2 of the axle A, the backing ring 34 is advanced over the journal 2 and its contoured surface 36 is brought against the fillet 4. The bearing B comes as a subpackage, it being unitized by the seals 82. The cones 12 of the packaged bearing B are next advanced over the journal 2 within enough force to overcome the interference fit, with the advance continuing until the back face 24 of the inboard cone 12 bears firmly against the abutment face 38 on the end of the backing ring 34. In this condition, the backing ring 34 is captured firmly between the fillet 4 and the inboard cone 12. Next the end cap 42 is fitted over the outboard end of the journal 2 with its abutment face 48 against the back face 24 of the outboard cone 12. After the end cap 42 is rotated to align its bolt holes 72 with the threaded holes 8 in the journal 2, the cap screws 50 are inserted through the holes 72 and engaged with the threaded holes 8. The cap screws 50 are turned down until their heads bear snugly against the raised surfaces 70 on the bolt bosses 68. Enough torque is applied to the cap screws 50 to clamp the cones 12 and the spacer ring 18 firmly between the end cap 42 and the backing ring 34 and to hold the backing ring 34 firmly against the fillet 4. The torque deflects the end cap 42 in its thinnest section, that is in the regions backed by the recessed surfaces 80. Lesser deflections occur at the ribs 78. As the cross wall 44 of the end cap 42 deflects the raised surfaces 70 on the bolt bosses 68 more closely approach an orientation perpendicular to the axis X and thus the undersides of the heads for the cap screws 50 seat generally uniformly along the raised surfaces 70 of the bolt bosses 68. This minimizes the prospect of water migrating along the cap screws 50 to the journal 2.

More importantly, the deflection of the cross wall 44 imparts a more uniform distribution of force along the abutment face 48 on the axial wall 46. Whereas end caps with cross walls of generally uniform thickness concentrate the clamping force in the regions immediately outwardly from the cap screws, the end cap 42, by reason of the somewhat flexible regions between the ribs 78 of its cross wall 44, effect a more uniform distribution of the clamping force. The end cap 42 undergoes less distortion in its axial wall 46, and the prospect of gaps developing between the abutment face 48 on the axial wall 46 and the back face 24 of the outboard cone 12 is diminished and indeed eliminated. In short, the recessed surfaces 80 and the ribs 78 in the cross wall 44 render the end cap 42 flexible in a manner that effects a generally uniform distribution of the clamping force along abutment face 48.

Figure 6:
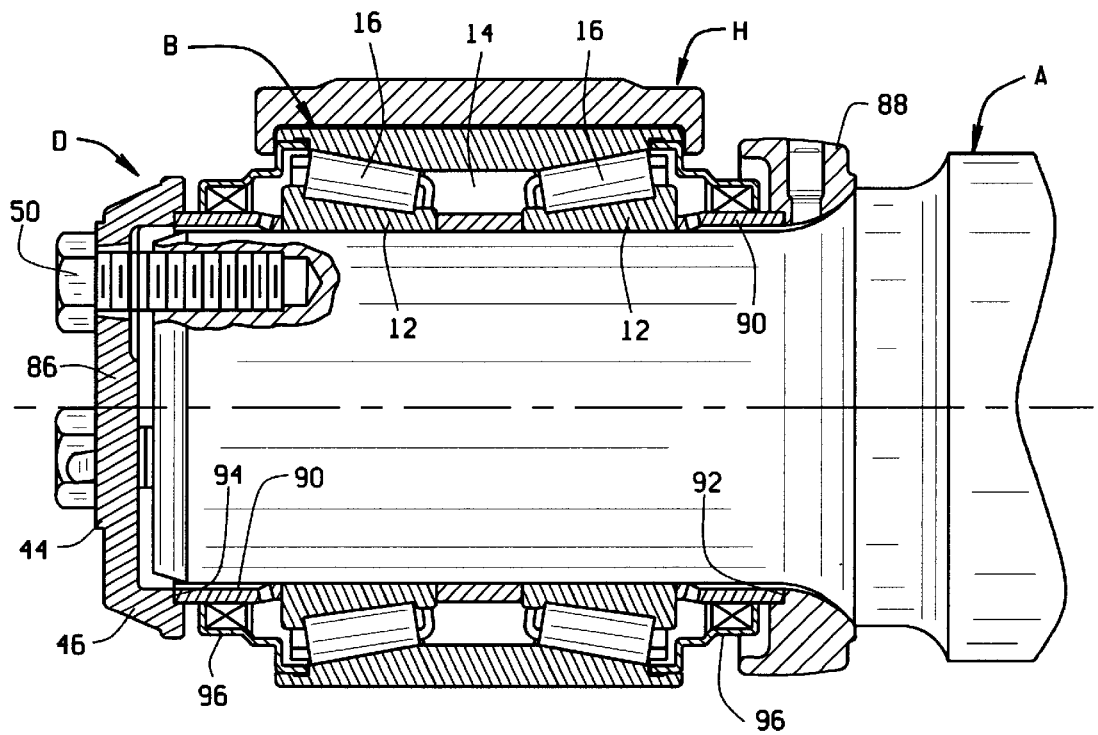
FIG. 6 is a sectional view of a slightly different bearing assembly with its end cap modified to accommodate it.

A modified end cap 86 (FIG. 6) is suitable for use in a bearing assembly D that differs in some respects from the bearing assembly C, in the sense that the bearing assembly D is the predecessor of the bearing assembly C. The bearing assembly D includes a bearing B which is essentially the same as the bearing B for the assembly C, except that the thrust ribs 22 on its cones 12 are not as long. The bearing assembly D has a backing ring 88 that fits against the fillet 4 at the end of the journal 2. It also has two seal wear rings 90, one that fits between the backing ring 88 and the inboard cone 12 and the other that fits between the end cap 86 and the outboard cone 12.

The backing ring 88 contains a counterbore 92 to receive the inboard wear ring 90, whereas the end cap 86 has another counterbore 94 that receives the end of the outboard wear ring 90. The base of the counterbore 94 constitutes an abutment surface for transferring the clamping force imparted by the cap screws 50 to the outboard wear ring 90 which in turn transfers it to the outboard cone 12.

The bearing assembly D contains seals 96 which fit into the end bores 30 of the double cup 14 and establish fluid barriers around the seal wear ring 90. U.S. Pat. No. 4,819, 949 shows a seal suitable for use as each of the seals 96.

What is claimed is:

1. An end cap for installation over the end of an axle journal to hold a bearing on the journal, said end cap having an axis that coincides with the axis of the bearing and comprising: an axial wall located around the axis and a cross wall formed integral with the axial wall and closing an end of the end cap, the axial wall having an outer end where it is joined to the cross wall and an inner end provided with an abutment surface that is presented away from cross wall and lies in a plane that is perpendicular to the axis, the cross wall having bolt holes located around the axis, the cross wall being thicker between the bolt holes and thinner at the bolt holes.

2. An end cap according to claim 1 wherein the cross wall has a front face which is presented away from the abutment surface and a rear face which the axial wall encircles; and wherein the bolt holes extend between the front and rear faces; and wherein the rear face has ribs located between the bolt holes and recessed surfaces located between the ribs.

3. An end cap according to claim 2 wherein the recessed surfaces surround the bolt holes where the bolt holes open out of the rear face.

4. An end cap according to claim 3 wherein the recessed surfaces on the rear face of the cross wall extend radially out to the axial wall.

5. An end cap according to claim 3 wherein the front face of the cross wall includes a peripheral surface which leads out to the axial wall and a raised land which projects axially from the peripheral surface.

6. An end cap according to claim 5 wherein the bolt holes are within the confines of the land.

7. An end cap according to claim 6 wherein the land has bolt bosses surrounding the bolt holes so that the bolt holes open out of the land through the bolt bosses.

8. An end cap according to claim 7 wherein each bolt boss has an end face which is inclined slightly downwardly toward that region of the peripheral wall that is closest to that bolt boss.

9. An end cap according to claim 6 wherein the land is generally triangular and the bolt holes are at the corners of the land.

10. In combination with an axle journal having an end face, a bearing assembly comprising: an antifriction bearing including an inner race located around the journal and having first and second back faces which are presented away from each other, an outer race surrounding the inner race, and rolling elements located between the inner and outer races, whereby the journal can rotate about an axis of rotation; an end cap having a cross wall located beyond the end face of the journal and an axial wall formed integral with the cross wall and located beyond the inner race of the bearing to prevent the bearing from moving off the journal, the cross wall having bolt holes which align with the threaded holes in the journal, the cross wall being thicker in cross section in regions generally between the bolt holes and thinner in cross section in regions generally between the bolt holes and the axial wall; and cap screws extended through the bolt holes in the end cap and threaded into the threaded holes in the journal to secure the end cap to the journal.

11. The combination according to claim 10 wherein the journal terminates at a shoulder and the bearing assembly further includes a backing ring located against the shoulder, the backing ring being presented toward the inner race of the bearing.

12. The combination according to claim 11 wherein the axial wall of the end cap has an abutment face which is presented away from the cross wall and bears against the first back face of the inner race and the backing ring also has an abutment face which is presented away from the shoulder and bears against the second back face of the inner race; and wherein the cap screws exert a force which clamps the inner race of the bearing between the backing ring and the end cap and the backing ring between the shoulder and the inner race.

13. The combination according to claim 11 wherein the bearing assembly further includes a first seal wear ring located between the end cap and the first back face of the inner race for the bearing, and a second seal wear ring located between the backing ring and the second back face of the inner race of the bearing; wherein the bearing assembly also includes seals which are fitted to the outer race of the bearing and establish dynamic fluid barriers around the seal wear rings; and wherein the axial wall of the end cap contains a bore which receives the end of the journal and a counterbore which receives an end of the first seal wear ring.

14. The combination according to claim 10 wherein the cross wall of the end cap has a front face which is presented away from the end face of the journal and a rear face which is presented toward the end face of the journal; and wherein the rear face has ribs which extend generally radially from the axis to the axial wall and are located between the bolt holes and recessed surfaces located between the ribs and surrounding the bolt holes.

15. The combination according to claim 14 wherein the front face has a peripheral surface which leads out to the axial wall and a raised land which projects beyond the peripheral surface; and wherein the bolt holes are in the land.

16. The combination according to claim 15 wherein the land has bolt bosses surrounding the bolt holes so the bolt holes open out of the land through the bolt bosses.

17. An end cap according to claim 16 wherein each bolt boss has an end face which is inclined slightly downwardly toward the region of the axial wall closest to that bolt boss.

18. The combination according to claim 15 wherein the land is generally triangular and the bolt holes are at the corners of the triangular land.

19. In combination with an antifriction having an inner race provided with a back face, an outer race surrounding the inner race, and rolling elements located between the inner and outer races, whereby the inner race can rotate within the outer race about an axis of rotation, an end cap having a cross wall and an abutment surface surrounding the cross wall and being located opposite the back face on the inner race of the bearing, the end cap through its abutment surface exerting a force on the inner race, the cross wall having bolt holes and being thicker in cross sections in regions generally between the bolt holes and thinner in cross section at the bolt holes.

* * * * *